(12) United States Patent
Silventoinen et al.

(10) Patent No.: US 6,381,231 B1
(45) Date of Patent: Apr. 30, 2002

(54) PRIVATE BASE STATIONS

(75) Inventors: Marko Silventoinen, Helsinki; Pekka Ranta, Nummela, both of (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/101,600

(22) PCT Filed: Jan. 16, 1997

(86) PCT No.: PCT/IB97/00060

§ 371 Date: Nov. 27, 1998

§ 102(e) Date: Nov. 27, 1998

(87) PCT Pub. No.: WO92/04796

PCT Pub. Date: Mar. 19, 1992

(30) Foreign Application Priority Data

Jan. 18, 1996 (GB) ............................................. 9601022

(51) Int. Cl.$^7$ ............................... H04J 3/06; H04Q 7/20
(52) U.S. Cl. ........................ 370/332; 370/345; 370/358; 370/498; 455/444
(58) Field of Search ................................ 370/280, 310, 370/328, 331, 332, 337, 336, 345, 347, 350, 498, 503, 915, 329, 343; 455/426, 437, 502, 552, 444, 446, 449; 714/707, 715, 798

(56) References Cited

U.S. PATENT DOCUMENTS

| 4,850,036 A | 7/1989 | Smith .......................... 455/179 |
| 4,872,205 A | 10/1989 | Smith .......................... 455/58 |
| 4,887,266 A | 12/1989 | Neve et al. ................. 370/95.1 |
| 5,212,684 A | * 5/1993 | MacNamee et al. ........ 370/280 |
| 5,315,589 A | 5/1994 | Kepley et al. ................. 370/62 |
| 5,388,102 A | 2/1995 | Griffith et al. ........... 370/105.1 |
| 5,448,570 A | * 9/1995 | Toda et al. .................. 370/337 |
| 5,519,759 A | 5/1996 | Heineck et al. ................ 379/59 |
| 5,561,846 A | 10/1996 | Hagio ........................ 455/34.1 |
| 5,703,873 A | * 12/1997 | Ojanpera et al. ........... 370/332 |

FOREIGN PATENT DOCUMENTS

| EP | 0 592 209 A1 | 4/1994 |
| EP | 0 626 796 A1 | 11/1994 |
| EP | 0 665 659 A2 | 2/1995 |
| GB | 2 189 370 A | 10/1987 |
| GB | 2 203 314 A | 10/1988 |
| GB | 2 208 778 A | 4/1989 |
| GB | WO 92/04796 | * 3/1992 |
| GB | 2261 141 A | 5/1993 |
| GB | 2 279 850 A | 1/1995 |
| GB | 2293526 A | * 3/1996 |
| JP | 3-283924 | 12/1991 |
| JP | 4-360-431 | 12/1992 |
| JP | 06315185 | 8/1994 |
| WO | WO 88/01816 | 3/1988 |
| WO | WO 94/18764 | 8/1994 |
| WO | WO 94/28643 | 8/1994 |
| WO | WO 94/22245 | 9/1994 |
| WO | WO 95/12255 | 5/1995 |

* cited by examiner

Primary Examiner—Alpus H. Hsu
Assistant Examiner—Afsar M. Qureshi
(74) Attorney, Agent, or Firm—Perman & Green, LLP

(57) ABSTRACT

A private base station (231) provides communication directly between a cellular mobile telephone (201) operable within a cellular network and a public switched terrestrial network (116). The base station is configurable to establish communication to a mobile telephone while minimizing interference with similar base stations. The base stations may transmit on similar frequencies but within different time division multiplexed time slots.

12 Claims, 10 Drawing Sheets

MOBILE AND HOME BASE STATION AT FREQUENCY A

PRIVATE BASE STATIONS

FIELD OF INVENTION

The present invention relates to private base stations arranged to provide communication directly between a cellular mobile telephone, operable within in a macro cellular network, and a public switched terrestrial network.

BACKGROUND

In cellular networks, it is necessary to adopt an optimized coverage policy in terms of providing sufficient signal strengths at locations within the region covered while minimizing infrastructure expenditure. Experience has shown that user penetration is price sensitive and customers will tolerate a degree of signal degradation when the level of service is reflected in their connection charges. Thus, it is theoretically possible to provide superb radio coverage over wide geographical areas, however the cost of doing this often proves prohibitive and would result in a reduced customer penetration with system operators being unable to establish a profitable network.

In areas where it is not possible to obtain a sufficiently strong communication signal, other modes of communication, such as connection to a public switched telephone network are often available. Furthermore, customers may be reluctant to use mobile equipment if less expensive land based systems are readily accessible at a particular location. This will tend to discourage customers from regularly using mobile equipment which in turn may reduce overall system use due to the mobile equipment not being readily accessible.

A private base station provides a mechanism for relieving the above problems in that, in preference to being connected to an established cellular network, a mobile phone user may establish a connection to a dedicated private base station which in turn allows the mobile telephone equipment to be used to establish conventional telephone calls via land based networks such as the PSTN. Thus, when the customer is in close proximity to their private base station, it is possible for the customer to obtain the benefits of using a personal mobile telephone while at the same time only experiencing connection costs equivalent to those experienced when using a PSTN handset.

Two significant problems exist with the use of conventional base station equipment in the role of a private base station. Firstly, the private base station must facilitate communication with mobile telephones in its geographical area while at the same time it is essential that it does not interfere with surrounding cellular networks. Secondly, existing base stations are configured to communicate with a plurality of users therefore although the cost of an individual base station is relatively high, this cost, over a period of time, is shared by many users as they enter the geographical area. However, private base stations will tend to provide services for one user or at most a relatively small number of users therefore the overall cost of providing such a base station must be substantially reduced if it is to appear commercially attractive to potential users.

A conventional base station is disclosed in British patent publication 2 249 922, wherein communication between a cellular mobile telephone and a public switch terrestrial network is provided, while minimising interference with similar base stations. Base stations for both public and private use are also disclosed in International patent publication 92/04796.

SUMMARY OF THE INVENTION

According to a first aspect of the present invention, there if provided a private base station arranged to provide communication directly between a cellular mobile telephone, operable within a macro cellular network, and a public switched terrestrial network; wherein said base station includes processing means configurable to transmit signalling information over an available time slot to establish a call; and said processing means is configurable to transmit user-traffic via said available time slot after a call has been established, thereby minimising interference with similar base stations.

In a preferred embodiment, the processing means is configured to synchronise said base station to a second base station and thereafter identify itself as being available to synchronise a third base station.

According to a second aspect of the present invention, there is afforded a method of providing direct communication between a cellular mobile telephone, operable within a macro cellular network, and a public switched terrestrial network, by means of a private base station including processing means, comprising steps executed by said processing means of transmitting signalling information over an available time slot to establish a call; and transmitting user traffic via said available time slot after a call has been established, thereby minimising interference with similar base stations.

DETAILED DESCRIPTION OF THE PREFERRED EMBODIMENTS

Figure 1:
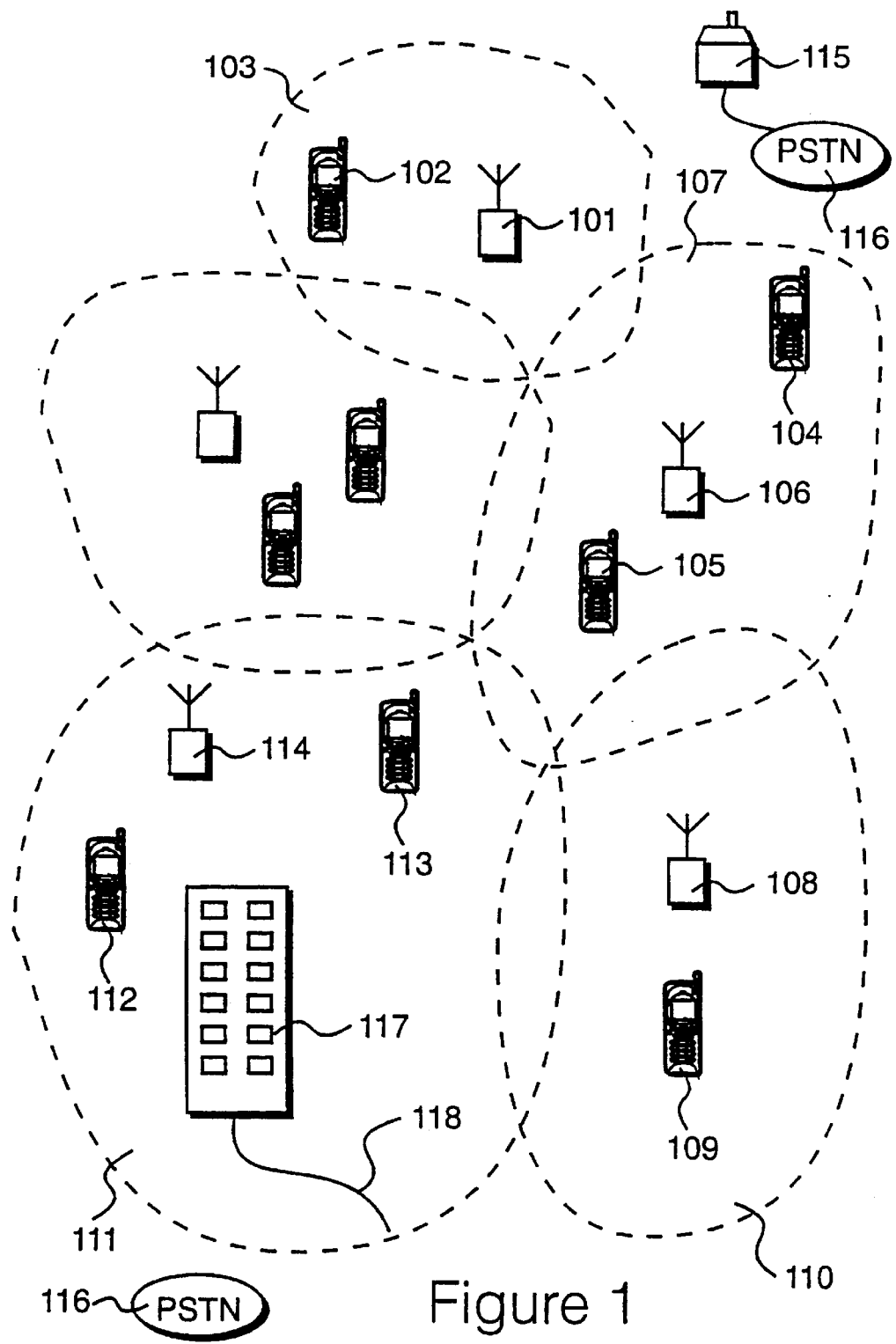
FIG. 1 shows a cellular communications network having a plurality of base stations, a plurality of mobile stations and environments where communication to conventional base stations is impaired.

A digital cellular network is illustrated in FIG. 1, operable in accordance with the GSM protocol, embodying time division multiple access techniques. The network includes a first base station 101 capable of communicating with mobile telephones, such as mobile telephone 102, within a communication region or cell 103. Similarly, mobile telephones, such as 104 and 105 communicate with base station 106 in cell 107, base station 108 communicates with mobile telephone 109 in cell 110 and cell 111 allows mobile telephones 112 and 113 to communicate with base station 114. Furthermore, as the mobile telephones are moved within the area of coverage, handovers will occur between base stations. Thus, as mobile telephone 104 is moved away from base station 106 and towards base station 101 a handover will occur such that transmissions from the mobile telephone to base station 106 will cease and a communication will be initiated with base station 101, as is well known in the art.

The cellular network may be considered as providing coverage within a built-up area and, given the level of penetration and requirements for cellular services, it is appreciated that regions exist where cellular coverage is not provided. Building 115 is positioned in such a location although a resident of this building regularly travels into the built-up area and often makes use of mobile equipment while in the area covered by the network. However, while resident within building 115 it is not possible for the cellular network to be used given that it is not possible for the mobile equipment to establish communication channels with any of the nearby base stations, such as base stations 101 and 106.

Mobile telephones 112 and 113 communicate with base station 114 when located within cell 111. However, cell 111 includes a number of large buildings, such as office block 117 where conventional communication to the base station 114 creates problems. Firstly, due to a high metal content within building 117, radio signals from the building 117 to the base station 114 are severely attenuated therefore in many locations within building 117 it is not possible to establish a communication channel. Furthermore, it is recognised that building 117 contains a relatively high number of mobile users therefore even when conditions permit connections to be made to base station 114 the availability of channels rapidly saturates and again customers may experience difficulties when communicating via their mobile equipment.

In order to allow guaranteed use of cellular mobile telephones at building 115 and building 117, residents are provided with their own private base station. The private base stations communicate with mobile equipment but are arranged to provide communication directly to the PSTN, while remaining operable within a cellular macro network. Thus, within the macro coverage region and outside building 117, mobile telephones, such as telephone 113, operate in a conventional way by establishing communication to the public base stations, such as base station 114, which are in turn arranged to establish communication through terrestrial networks etc. However, when a user enters their private domain, communication is improved by the existence of a private base station. The private base station is configured such that communication between the private base station and the mobile telephone adheres to accepted transmission standards. However, the private base station does not form part of the cellular macro network and establishes a direct communication to terrestrial channels. Thus, under these circumstances, the mobile telephone effectively operates as a private "cordless" telephone using the public switch telephone network 116.

Figure 2:
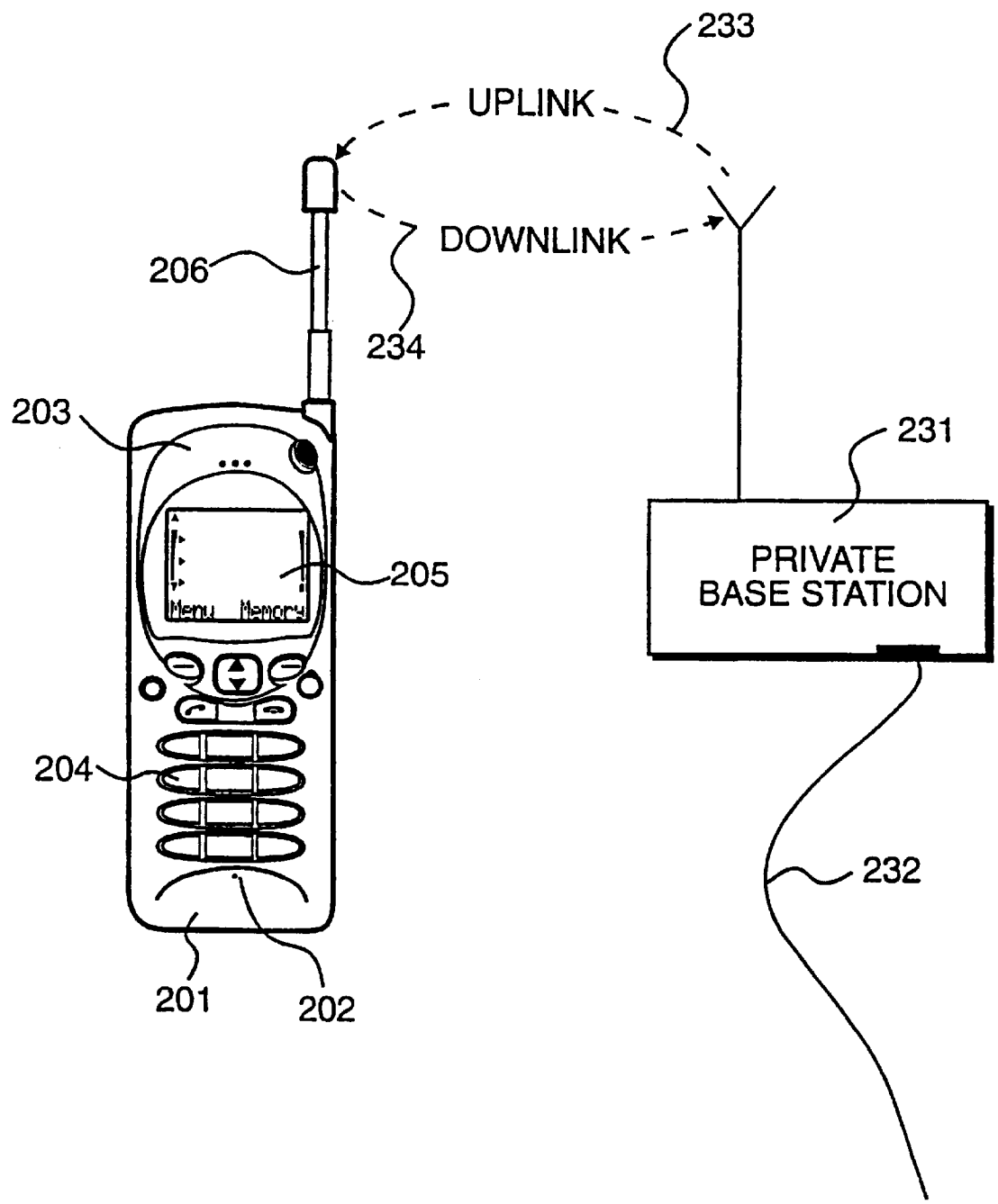
FIG. 2 details a mobile telephone communicating with a private base station within a cellular microcell.

A digital mobile telephone capable of operating in accordance with the GSM recommendation is shown in FIG. 2, arranged to communicate with a privates base station. The mobile telephone 201 is shown in FIG. 2, having a mouthpiece microphone 202, an ear-piece loudspeaker 203, signalling buttons 204 and a liquid crystal display 205. The telephone 201 is arranged to communicate with the base stations via an antenna 206 and digital processing of encoded speech signals is effected by means of a digital signal processor controlled in response to control signals generated by a microcontroller. Alternatively, mobile phones operating in accordance with other time division multiple access systems may be used such as DCS 1900.

The mobile telephone is capable of communicating with established base stations, such as base stations 101 etc in the macro cellular network illustrated in FIG. 1. In addition the mobile telephone is configured to communicate with a private base station 231, that in turn allows a connection to the conventional PSTN 116 via a base band analog telephone line 232.

In the network shown in FIG. 1, it is necessary for each base station to simultaneously communicate on a plurality of frequencies with a plurality of multiplex digital channels being conveyed on each of these frequencies. In normal rate operation eight multiplex channels are provided on each transmission frequency and in the half rate mode of operation it is possible for a total of sixteen channels to be transmitted over a single frequency. However, in the environment illustrated in FIG. 2, the private base station may only make a single connection to the PSTN via analog line 232, therefore at any one time, it is only possible for the base station 231 to communicate with a single mobile telephone unit, such as unit 201. In accordance with accepted protocols, an uplink channel 233 is provided from the mobile telephone 201 to the private base station 231 and a downlink channel 234, operating on a different frequency, allows signals to be sent back from the private base station 231 to the mobile telephone 201. Thus, this limitation in terms of base station complexity is exploited in order to substantially reduce the cost of manufacturing such units, thereby making them substantially more attractive to customers, particularly in locations where it is difficult to establish normal communications using a cellular network. However, a problem with using very simple private base stations of substantially similar design is that, when placed in relatively close proximity, the base stations have a high probability of suffering from mutual interference.

Following the established GSM recommendation, the frequencies employed for the uplink transmission 233 and the downlink transmission 234 do not remain constant, in order to mitigate the effects of radio interference and attenuation etc. Thus, a burst of information may be lost, due to it being transmitted via a frequency having particularly poor transmission characteristics within the area concerned but the next burst will be received given that this burst will be transmitted on a different frequency. Pseudo random number generators are included which once initiated from a particular random seed, result in a specified sequence of pseudo random numbers being generated both at a transmitter and at a receiver. Thus, as a transmitter hops to a new transmission frequency, a similar hop is effected at the receiver such that the receiver will be tuned to receive the next transmitted burst. Sequences of pseudo random numbers are generated for both the uplink transmission 233 and the downlink transmission 234, the selected frequencies being different so as to facilitate the separation of transmission and reception at both stations.

The GSM protocols allow each transmission frequency to convey eight time-multiplexed channels thereby allowing each transmission frequency to convey eight separate channels of traffic. However, in the arrangement shown in FIG. 2, private base station 231 is only required to establish a single communication channel on a first frequency for the uplink 233, with a similar channel being provided, on a different frequency, for the downlink 234. Each transmitted channel still occupies one-eighth of the available capacity in order to maintain similar transmission protocols with the rest of the GSM network but the remaining seven are not actually required for traffic transmission.

In the wider GSM network a high degree of common channel signalling is provided to ensure synchronisation of the network and to facilitate hand-overs as mobile telephones are moved from one cell to another. In the arrangement shown in FIG. 2 the micronetwork, consisting of the base station 231 and its associated mobile telephone 201, is effectively isolated from the signalling transmission of the surrounding macro network, therefore signalling supplied to the mobile telephone 201 originates from the private base station 231, while the telephone is within the region covered by the micro network.

Figure 3:
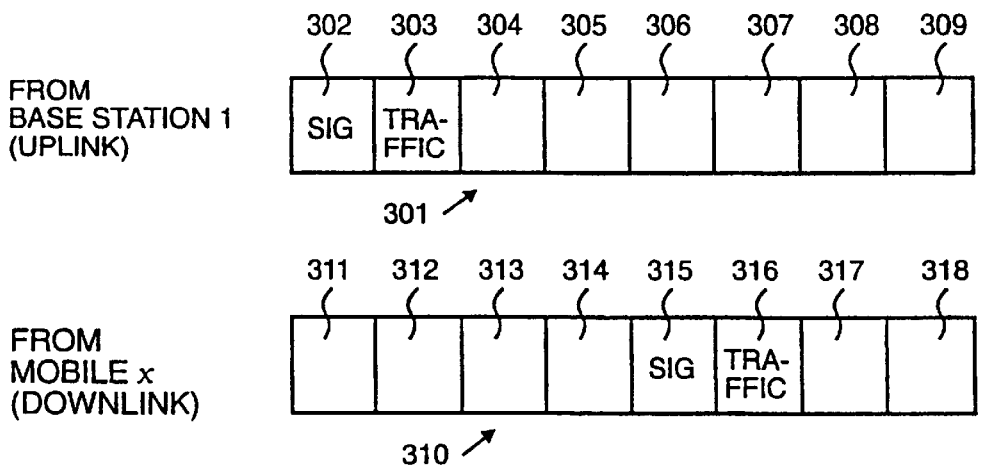
FIG. 3 and FIG. 4 illustrates protocols of a first embodiment for communicating within the microcell identified in FIG. 2.

An arrangement for facilitating the transmission of signalling data and user traffic in the environment shown in FIG. 2 is detailed in FIG. 3. A downlink frame 301 is illustrated having eight individual time slots 302 to 309. The base station 231 only requires one of these time slots to provide a traffic channel for the downlink 234. The base station 231 is configured to allocate the second time slot 303 for this purpose, with the first time slot 302 being used for the transmission of signalling information.

Figure 4:
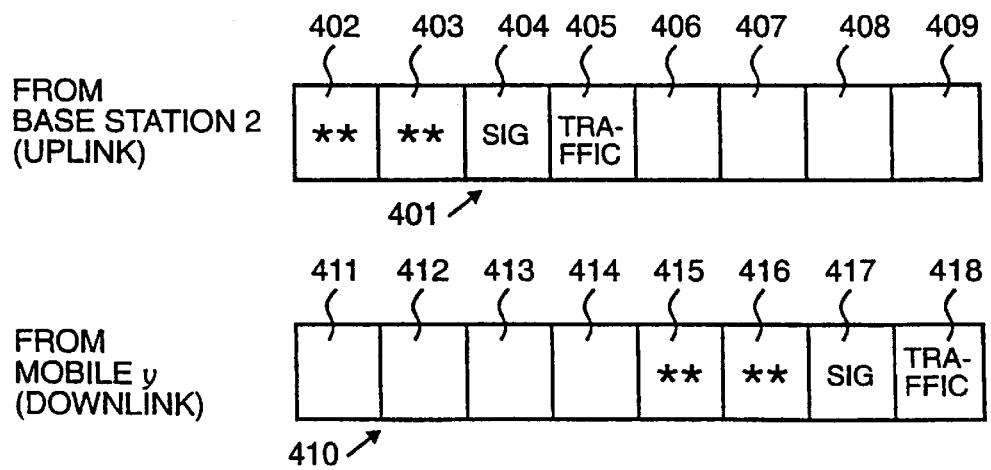

A similar arrangement is provided for the uplink 233 with a transmitted frame 310 having its own eight time slots 311 to 318. The transmission of these frames is synchronised such that time slot 302 will be transmitted over the uplink in synchronously delayed with respect to time slot 311 of the downlink 234. A mobile telephone is arranged such that the processing of received data, via the downlink is displaced from the processing of transmitted data, via the uplink, such that time slots 311 and 312 will not be used for transmission purposes. In order to provide the mobile telephone 201 with a maximum period of time between transmissions, transmission channels 315 and 316 are selected for the transmission of signalling data and user traffic respectively. Thus, in both the uplink and downlink transmission frequencies, a first time slot has been allocated for signalling and a second time slot has been allocated for user traffic. Under normal circumstances, within a macro network, this would be considered wasteful, given that a one-to-one relationship between traffic and signalling is not required. However, it is possible for other microcells to overlap with the first cell, with both cells using similar frequencies. Such an arrangement is shown in FIG. 4 which represents a second base station transmitting using frames within the same frequency band of the frames illustrated in FIG. 3. The second base station identifies the transmission frames as being incompletely used and will therefore capture individual channels for its own transmission purposes.

As far as the downlink is concerned for the second base station, it is not possible to capture the first two time slots 402 and 403 because these time slots are being used by the first base station, illustrated as 302 and 303 in FIG. 3. However, the second base station is in a position to capture the third and fourth transmission channels and in doing so it allocates channel 404 for the transmission of signalling with channel 405 being allocated for the transmission of user traffic.

A similar arrangement is then configured for the uplink with the seventh channel 417 being captured for the transmission of signalling information and the eighth channel 418 being captured for the transmission of user traffic. In the downlink, transmission channels 406 to 410 remain unoccupied and may be captured by other base stations with channels 411 to 414 remaining similarly unoccupied on the uplink and again being available for capture by other base stations.

Figure 5:
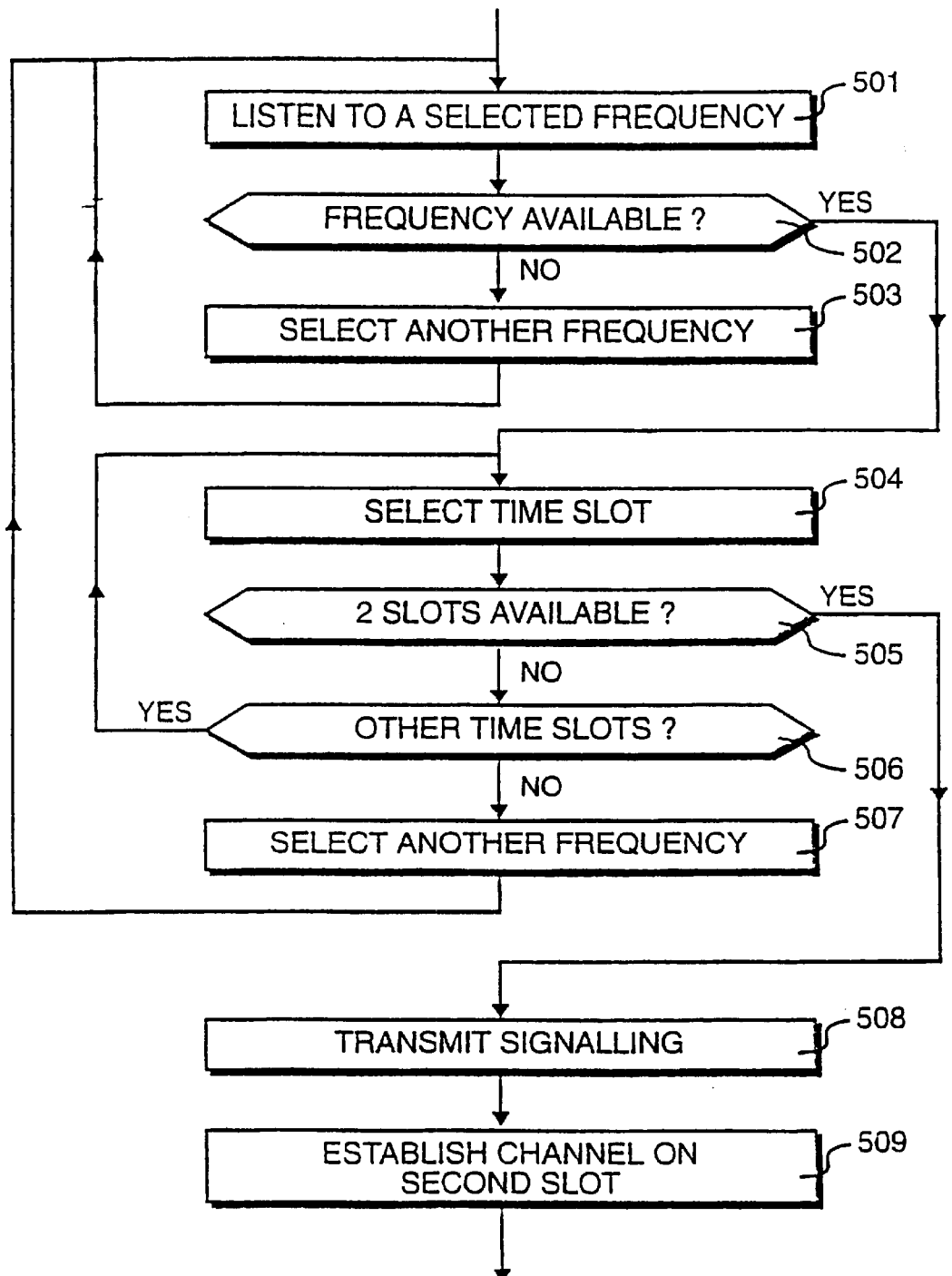
FIG. 5 illustrates procedures for implementing the protocols identified in FIGS. 3 and 4.

Procedures for implementing a connection within the environment shown in FIG. 2, in accordance with the procedures identified in FIGS. 3 and 4, are detailed in FIG. 5. In the preferred embodiment, communication channels between mobile telephones and private base stations are established when power is initially supplied to the private base station. Alternatively, a connection may be initiated by a user, wherein it is necessary for the mobile telephone 201 to initiate a link to the private base station 231. Alternatively, a conventional telephone call may signal on line 232 to the private base station 231 which will then initiate a communication to the mobile telephone 201. Thus, it should be understood that either the mobile telephone 201 or the base station 231 may initiate a call and the initiation protocols should be interpreted in this way.

At step 501 a recognition is made to the effect that a communication channel is to be established, resulting in the initiating station listening to identify a selected frequency. At step 502 a question is asked as to whether a channel is available and if answered in the negative a further frequency is selected at step 503 and control is returned to step 501. In remote locations where private base stations do not interfere with other private stations, it is unlikely that the question asked at step 602 will be answered in the negative. Consequently, control is directed to step 504 where time slots within the selected frequency are themselves selected.

At step 505 a question is asked as to whether two adjacent slots are available and if answered in the negative control is directed to step 507 where another frequency is selected and control is returned to step 501. If two adjacent time slots are available the question asked at step 505 is answered in the affirmative resulting in control being directed to step 508. Signalling information is transmitted at step 508 and a communication channel on the second adjacent slot is then established at step 509.

The procedures illustrated in FIG. 5 are implemented in order to create a first communication channel, the uplink 233 when initiated by the base station, whereafter similar procedures are implemented in order to establish the associated downlink 234.

The first preferred embodiment provides a useful protocol for establishing a microcell using a private base station for isolated users, such as a customer located in building 115. However, in the large office building 117 there is a requirement for a relatively large number of microcells to be created within the building and under these circumstances, the protocols identified in the first preferred embodiment would not make best use of the available capacity, given that each traffic channel will have its own associated signalling channel.

Figure 6:
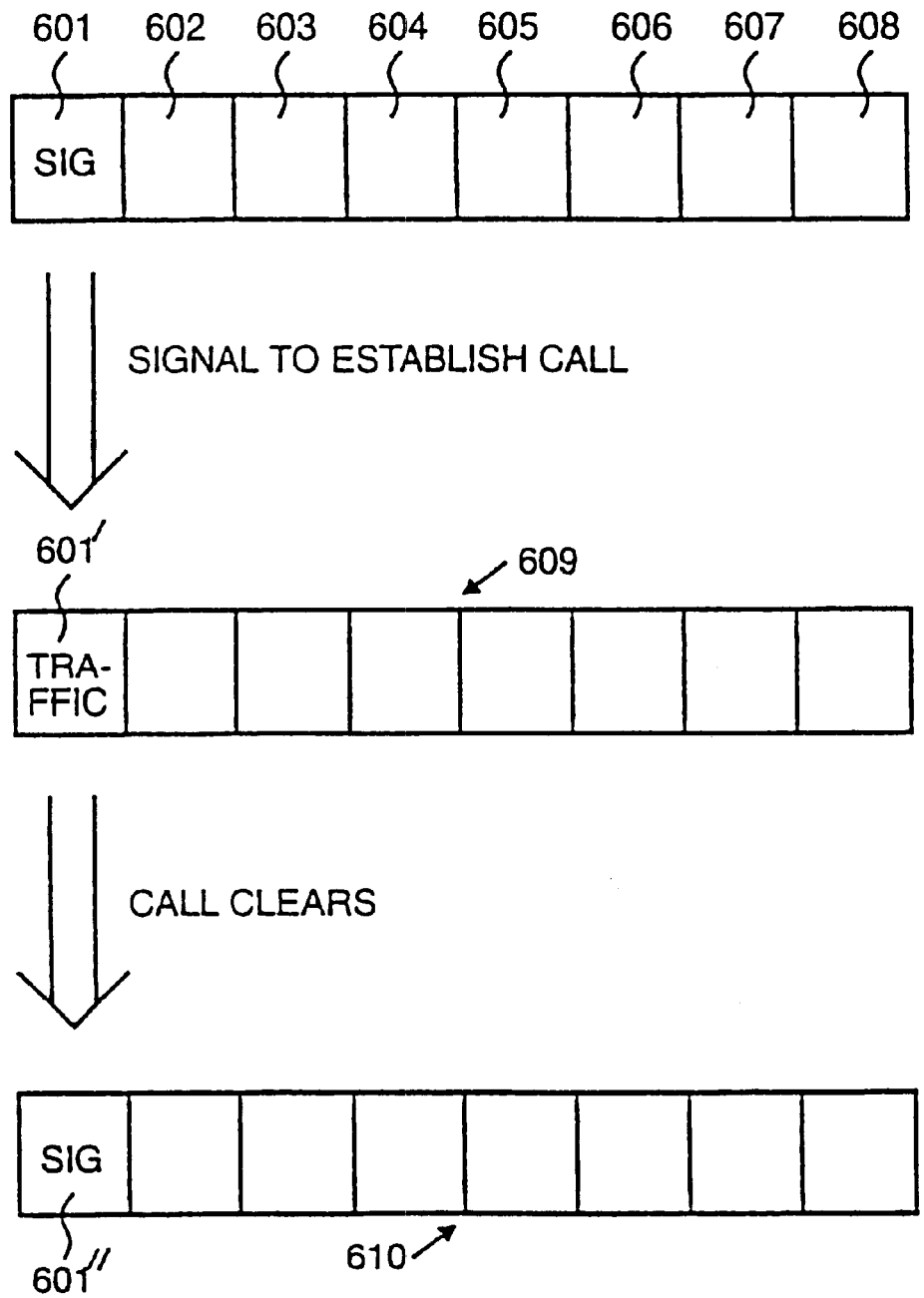
FIGS. 6 and 7 illustrate communication protocols in accordance with a second embodiment.

An alternative arrangement is illustrated in FIG. 6 in which a transmission frequency is used to transmit frames of data, each divided into eight time slots 601 to 618. Each microcell will be allocated one of these channels on respective frequencies to provide communication for its uplink and its downlink. While the telephone and base station, substantially similar to the arrangement shown in FIG. 2, are maintained in their idle mode, that is to say, the devices are activated but are not being used for traffic transmission, the allocated time slot, such as time slot 601 is used for signalling transmission. Thus, time slot 601 is used to supply signalling information when used for the uplink to allow the private base station to signal its associated mobile unit. This signalling information will be used to establish a call whereafter, as illustrated by transmitted frame 609, the same time slot 601' is used for the transmission of user generated traffic. This situation continues until the call effectively terminates, whereafter part of the call-clearing procedure involves re-establishing the channel for signalling purposes, as illustrated by channel 601".

It is possible that other mobile telephones may be allowed to access the same private base station therefore when implementing the procedures identified in FIG. 6 it is not possible for these other mobile stations to establish a call while the signalling channel 601 is being used to convey user traffic from another mobile station within the microcell. Thus, in order to maintain the integrity of the network, it is necessary to issue signalling to commands to these other mobile stations, via the signalling channel 601, to the effect that the channel is about to switch over to traffic communication, such that the other mobile stations are instructed to wait for a predetermined time before interrogating a channel to look for further signalling information.

Figure 7:
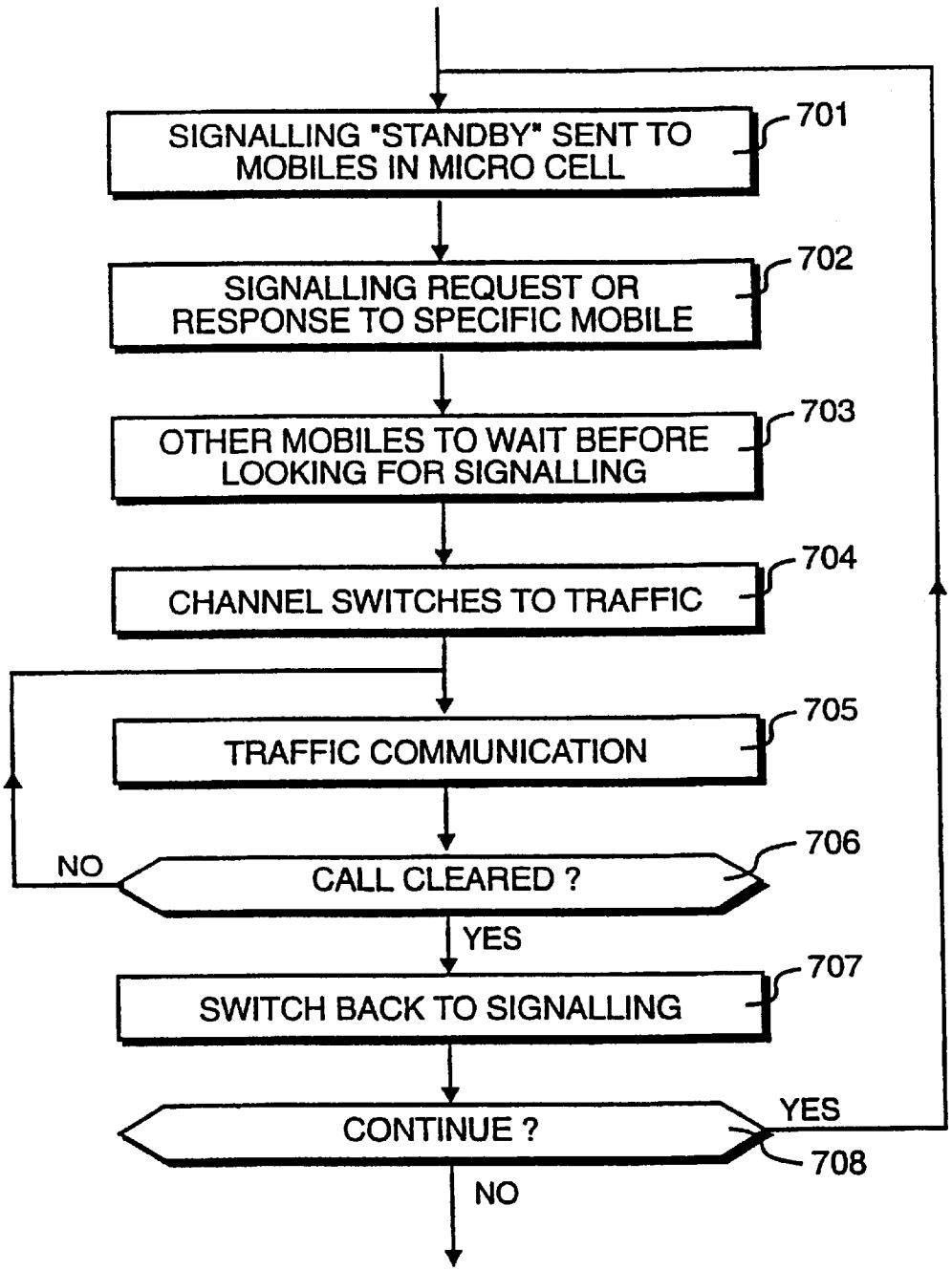

Procedures for implementing the second preferred embodiment are illustrated in FIG. 7. At step 701 a mobile's respective channel is established and signalling data is transmitted effectively informing the mobile telephone as to its status. At step 702 a request to initiate a call is made or in response to an incoming call a response is established. Thus, the mobile telephone must be activated from its idle state and signalling information is transmitted over the signalling channel. At step 703 the signalling channel is used to transmit a message to all mobiles within the microcell to the effect that they are required to wait for a predetermined time before interrogating the communication channel to determine whether it has been re-allocated back to signalling purposes. Any other mobile units within the microcell will respond to this message by waiting for a predetermined interval of time before invoking procedures to interrogate signalling information. If on making such an interrogation it is determined that signalling information continues not to be available, the mobiles will wait for a further predetermined period and so on repeatedly until the signalling channel is established.

At step 704 a communication channel, such as channel 601, is switched over to traffic transmission, whereafter traffic communication (usually voice) is performed with a question being asked at step 706 as to whether the call has been cleared. When answered in the negative, control is returned to step 705, with control being restrained within the loop of steps 705 and 706 until one of the parties terminates the call, resulting in the question asked at step 706 being answered in the affirmative.

After the question asked at step 706 is answered in the affirmative, the channel is switched back to a signalling channel at step 707 and at step 708 a question is asked as to whether the procedure should continue which, when answered in the affirmative, results in control being returned to step 701.

Thus, by using the same channel for signalling purposes and traffic communication it is possible to double the transmission capacity, which is highly desirable in congested areas such as the area contained within building 117.

The procedures identified in the second preferred embodiment increase the channel capacity such that the channel capacity for a transmission frequency used within a microcell environment becomes equivalent to that in the surrounding cellular network. This is achieved by allowing time slots to communicate in a signalling mode when signalling information is required then switching over to a traffic mode when user traffic communication is required. The problem with this approach is that it is not possible to supply any signalling information while a call is in progress. In a third preferred embodiment half rate coding is exploited in which a time slot transmitted during a first frame is used for signalling whereafter, in the subsequent frame, the same time slot is used for traffic data. This cycle is then repeated so that, for particular time slot, half of the frames transmit signalling information with the remaining framers transmitting user traffic. In theory, the allocation of frames for these two types of transmission could be configured with different ratios such that, for example, two frames could be used for user traffic for each frame of signalling information. However, the transmission of user traffic in half rate mode is an established part of the GSM recommendations and coding techniques are known for facilitating transmission at this rate.

Figure 8A:
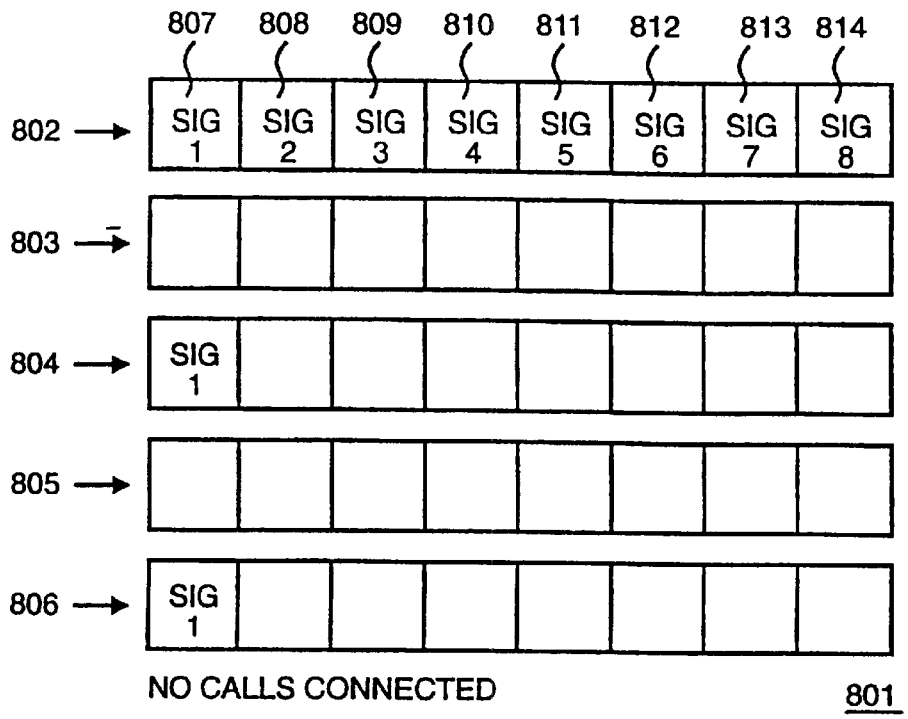
FIG. 8 illustrates a protocol for communicating within a microcell in accordance with a third embodiment.
Figure 8B:
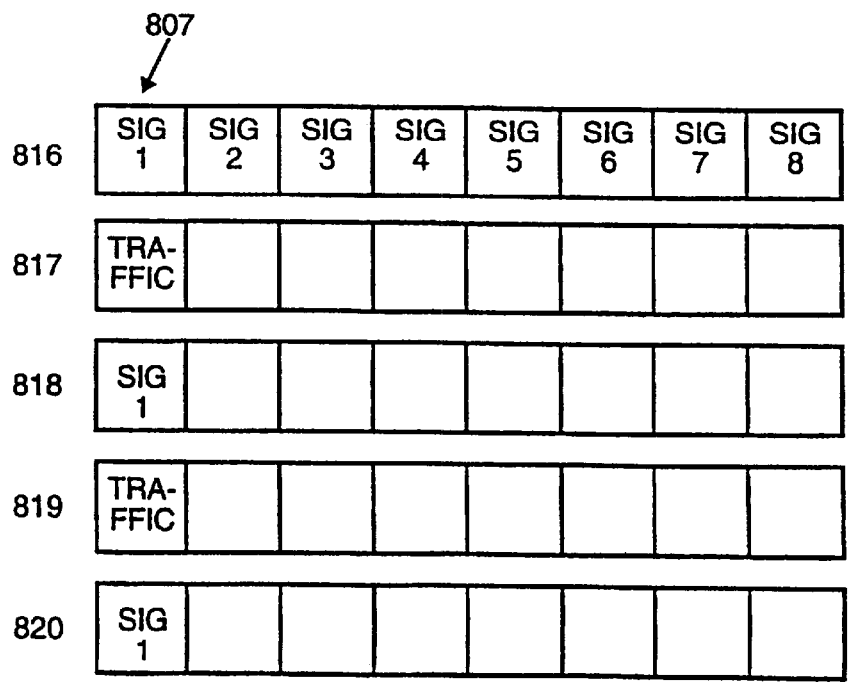

Half rate coding of the type identified above is illustrated in FIG. 8. 801 represents a sequence of transmitted frames during the idle condition. Frame 802 is transmitted during a first cycle, followed by frame 803 which is transmitted on the next cycle, followed by frame 804, 805 and 806 etc. Frame 802 comprises eight time slot channels 807, 808, 809, 810, 811, 812, 813 and 814. In this example time slot 807 has been captured for use within a microcell resulting in signalling information being transmitted within this time slot during frame 802. On the next frame 803 no information is transmitted within time slot 807 but for the next time slot, time slot 804, signalling information may again be transmitted. Similarly, no information is transmitted during frame 805 and signalling information may again be transmitted during frame 806.

Examples 815 represent the situation after a call has been connected allowing user generated traffic to be transmitted in time slot 807. Again, during frame 816 signalling information may be transmitted in time slot 807. It is not possible for signalling information to be transmitted during frame 817 and now that a call has been connected, user traffic is transmitted during frame 817. Again, signalling information may be transmitted during frame 818, followed by user traffic being transmitted during frame 819 and signalling information again being transmittable during frame 820.

The arrangement shown in FIG. 8 overcomes the problem of the removal of all signalling information while still allowing all eight time slots to be used for the transmission of user traffic. However, in order to achieve this, it is necessary to reduce the transmission capacity for user traffic which will result in a level of signal degradation.

The establishment of a call within the environment illustrated in FIG. 6 or the establishment of a call within the environment illustrated in FIG. 8 is substantially similar to the procedures detailed in FIG. 5. However, using these types of transmission, it is only necessary to identify a single time slot, thereby allowing eight multiplexed transmissions to occur over the same frequency. Thus, it is necessary to listen to a selected frequency and to determine whether the frequency is available. Thereafter, a single time slot is identified, without the need to identify two adjacent time slots, whereafter the transmission of signalling or traffic is implemented.

The first, second and third embodiments provide different solutions to similar problems associated with providing low cost private base stations for use within microcells. The optimum solution will depend upon the background environment and a private base station could be configured to provide all three types of communication with a particular communication type being selected so as to optimize performance for the particular environment in which the private base station is situated.

It has been recognized, particularly with reference to the second preferred embodiment and the third preferred embodiment, that nearby private base stations may transmit information on the same transmission frequency but with different time slot channels being allocated for the two microcells. In the surrounding cellular network this does not create a problem, given that the base stations are mutually synchronised and controlled by overseeing management functions. However, in micro-environments there is no means for providing synchronization signals to individual private base stations therefore each base station is responsible for generating its own timing and synchronization signals. In environments where microsystems do not interfere, this does not create a problem given that the synchronization of one base station will have no effect on surrounding base stations. However, when a plurality of base stations are located in a relatively small region, it is necessary for transmission frequencies to be reused by as many stations as possible by the allocation of transmission channels within specified time slots. Under these circumstances, it is necessary for a synchronization scheme to be adopted and without the provision of a central synchronization source, it is necessary for the micro-environments to mutually synchronize if transmission is taking place on the same set of frequencies.

Figure 9:
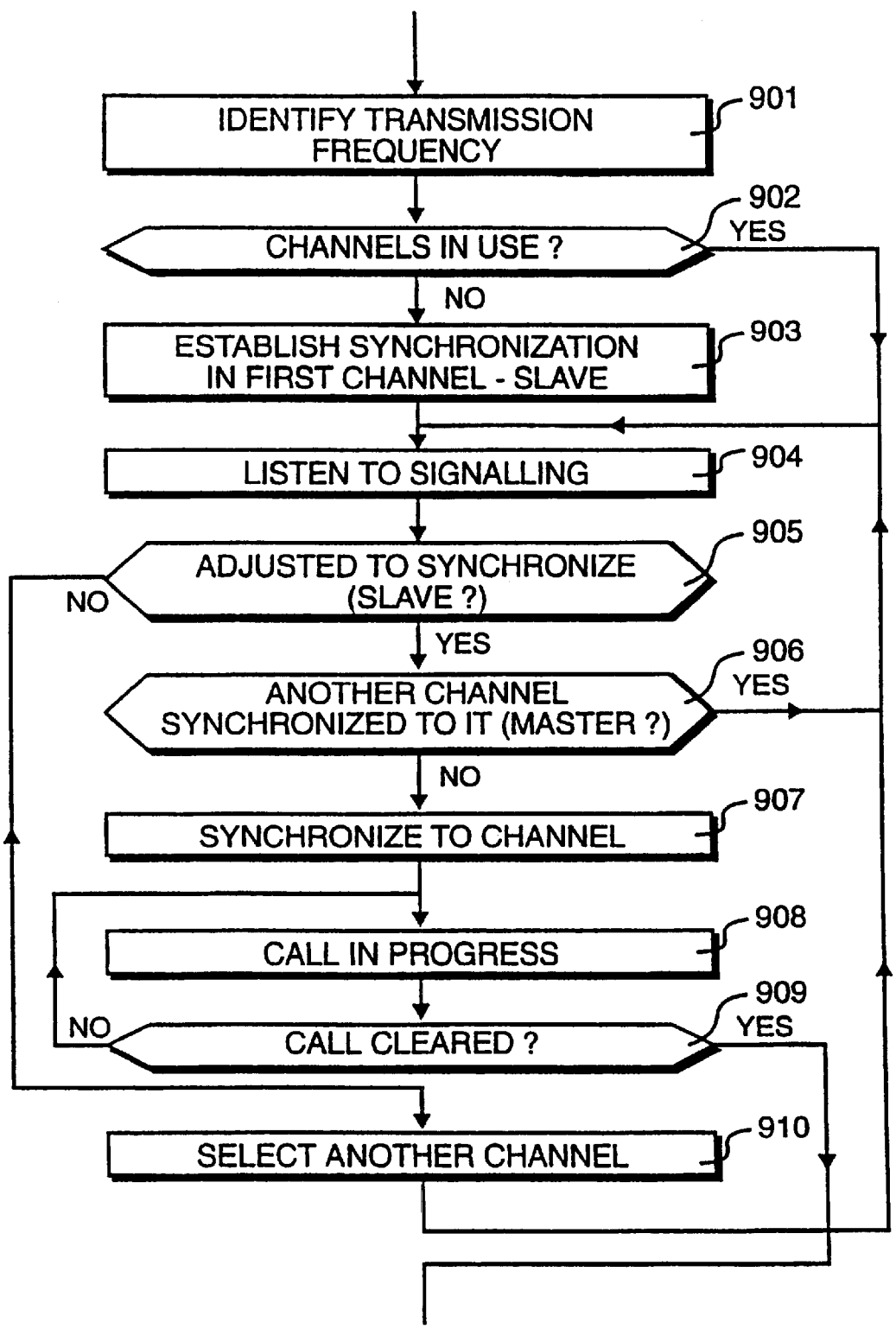
FIGS. 9 and 10 illustrate synchronising procedures in accordance with a fourth embodiment.

A procedure for effecting mutual synchronization between interfering private base stations is illustrated in FIG. 9. A mobile station or a private base station needs to identify a transmission channel before communication can be effected. The actual communication may involve any of the protocols previously described but when communicating close to another microsystem, measures must be adopted to ensure that the two microsystems do not mutually interfere; this would seriously jeopardize the integrity of the communication protocols.

In FIG. 9, a transmission channel is established when power is supplied to the private base station, by firstly identifying a transmission frequency at step 901. At step 902 a question is asked as to whether channels are in use within the frequency identified at step 901. If the question asked at step 902 is answered in the negative, to the effect that no channels are in use, synchronization is established in the first channel and the particular connection is identified as being both a master and a slave.

Figure 10:
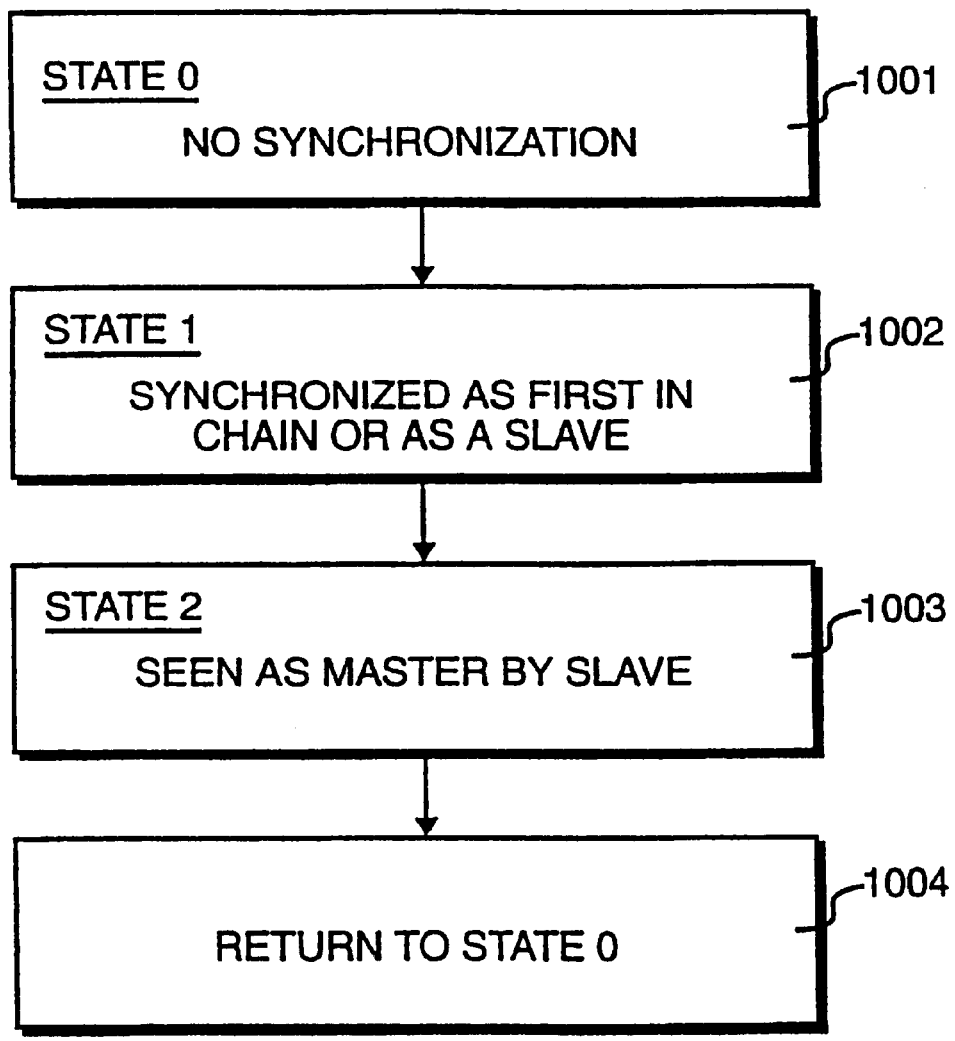

The particular types of communication or communication states are identified in FIG. 10. Most communication channels will undergo a transition starting from state 0, when no synchronization has been established because no transmission is taking place. On initiating a transmission path, state 1 is entered because the particular communication link under consideration is slaved to another synchronised channel. Thereafter, as a new user enters the multiplex, this user will synchronize to the channel which was itself was the last to join the multiplex, such that the particular channel under consideration which, previously considered as the slave and the last in the chain, now enters state 2 where it is seen as a master. Eventually, the channel under consideration will clear and the state will return to base level state 0.

Thus, if no channels are in use, resulting in the question asked at step 902 being answered in the negative, a communication link is established in the first channel at step 903; thus the link under consideration moves from state 0 to state 1 because it has effectively been synchronised for transmission purposes.

If channels are in use, resulting in the question asked at step 902 being answered in the affirmative, control is directed to step 904, resulting in listening procedures being effected in order to analyze the nature of other communication links that have been established within the multiplex. When a link is identified a question is asked at step 905 as to whether a detected station has been synchronised, thereby placing it into state 1. If this question is answered in the negative, the telephone is attempting to communicate in frequencies that have not been set up for this particular type of operation, resulting in control being directed to step 910 where another channel is selected. However, if the question asked at step 905 is answered in the affirmative, the channel identified at step 904 has been synchronised to an earlier master channel in the chain resulting in a question being asked at step 906 as to whether another channel has been synchronised to the channel identified at step 904. Thus, question 905 determines whether the identified channel is itself a slave, so that it may be converted to a master while step 906 considers whether the identified channel is already a master. Thus, if the question asked at step 906 is answered in the affirmative, the identified channel has already been elevated to state 2 such that it is not an appropriate channel for a further slave channel to be synchronised thereto. However, if the question asked at step 906 is answered in the negative, the channel identified at step 904 is only in state 1 such that the synchronization may be effected at step 907, resulting in the channel identified at step 904 being elevated to state 2.

At step 908 a call may be established and at step 909 a question is asked as to whether the call has been cleared. When answered in the negative control is returned to step 908 and control is retained within the typed loop until a call-clear is effected.

When the call is cleared, the question asked at step 909 will be answered in the affirmative, resulting in termination of the process.

Thus, no one individual private base station acts as a master for synchronizing stations within its region. A station may establish itself as a master, whereafter another station may be synchronised to it as a slave. However, as a third communication path is required, this will slave itself to the second communication path, not the original master, such that the title of most eligible master passes around from one station to the next.

In accordance with the fourth preferred embodiment, interference between private base stations is minimized by effectively synchronizing the base stations together such that the timing reference of a first station will be consistent with the timing reference of nearby stations, thereby allowing the stations to transmit communications in non-colliding time slots, in a manner that emulates the fully synchronised system of the background cellular network. However, a problem with the approach of the fourth embodiment is that in some situations not all of the stations within a particular region may be able to receive transmissions from all of the other base stations within that region. Thus, a first station may exist and it may be possible for a second station to receive signals from said first station and thereby synchronize to this first station. Similarly, it may be possible for a third station to synchronize with the first station such that the first station in combination with the second or the first station in combination with the third would not create any problems. However, it is possible, perhaps due to the arrangement of dividing walls etc, that the second station may not be able to receive transmissions from the third and similarly the third may not receive transmissions from the second. Under these circumstances it would be difficult for the role of most eligible master to be passed from one station to the next, resulting in non-optimum use of available capacity or service failure.

In a fifth preferred embodiment the problem of synchronizing adjacent micronetworks is completely bypassed and each micronetwork is allowed to establish its own frame synchronization. In order to reduce interference effects to tolerable levels, all data transmissions, including signalling transmissions, follow a frequency hopping regime where each private base station within a particular geographical region is given a unique frequency hopping sequence, such that any stray transmissions from adjoining regions will be treated as noise and, given that this interference will tend to occur for only one particular frame within many error free frames, the established procedures for interleaving and error correction should allow the corrupted data to be recovered.

Figure 11:
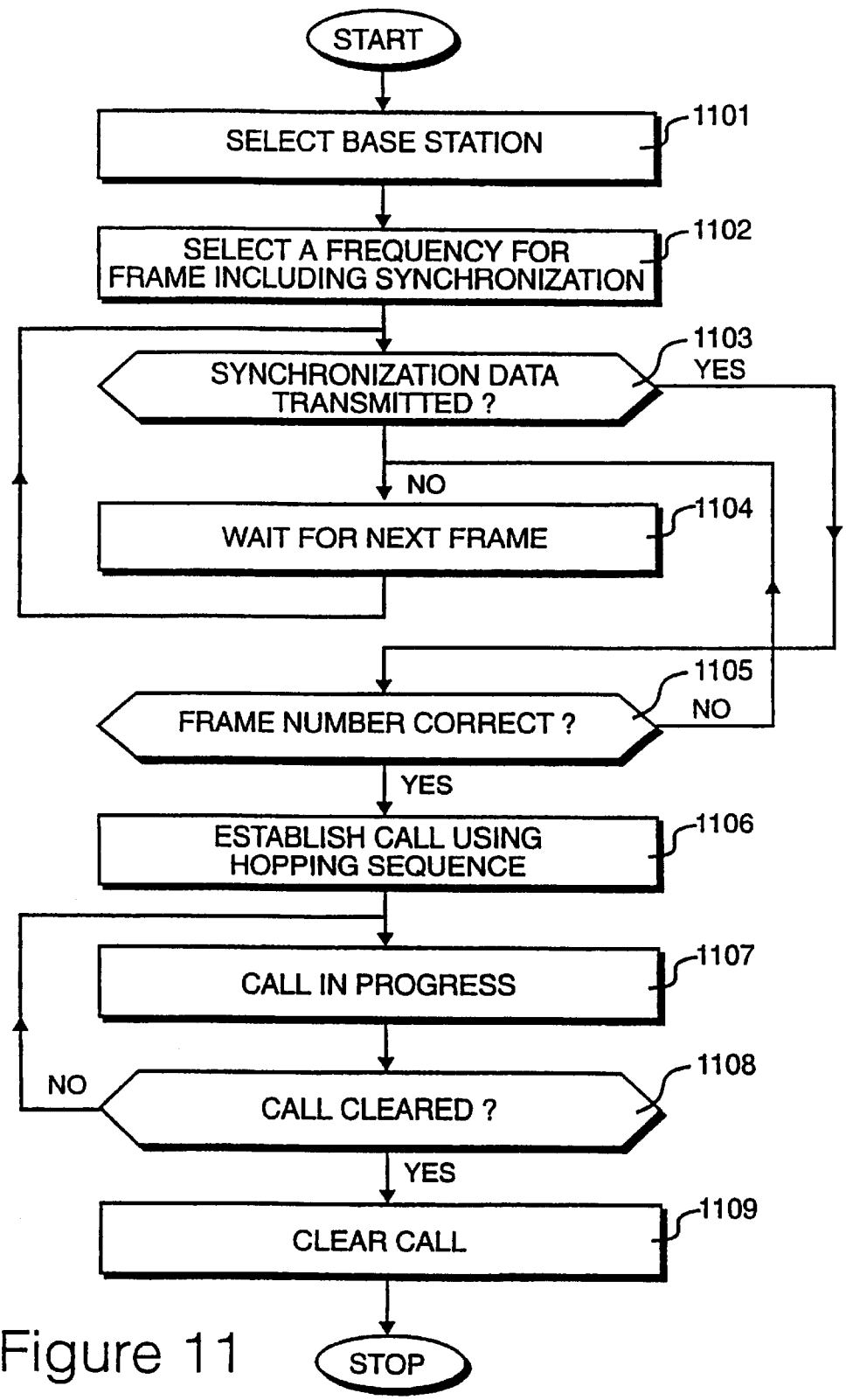
FIG. 11 illustrates a frequency hopping procedure in accordance with a fifth embodiment.

Procedures for implementing frequency hopping of this type are illustrated in FIG. 11. Each micronetwork will have its own random seed, thereby resulting in a unique sequence of frequency selections being made for that particular microcell. Mobile telephones will require modification for operating within such an environment and it is possible that a user may require a mobile telephone to operate in a plurality of environments of this type, each having their own frequency hopping sequence. At step 1101 a selection is made identifying the fact that the telephone will be used within a microcell environment and, if necessary, identifying the particular microcell under consideration. Thus, for example, a user may programme a mobile telephone with information identifying two microcells, possibly one at home with the second in an office.

When operating in this way, the telephone will not become active immediately from a power-up condition and it will be necessary for the telephone to wait until it can identify its position within a repeated regime of superframes. Each frame includes information identifying the number of that frame within the repeated cycle therefore having successfully received signalling information from one frame, by selecting the correct frequency for that frame, it is possible for the mobile station to identify the phase of the frequency hopping sequence. In addition, it is also necessary for the mobile station to synchronize its own internal clocks to the clock synchronization signals of the private base station and in order to achieve this, it is necessary for the mobile station to receive a frame which includes a synchronization data. Thus, at step 1102 a frequency is selected for a particular frame number which is known to include synchronization data of this type.

The mobile station remains tuned to the frequency selected at step 1102 and frame data will be received on the selected frequency. After a frame of data has been received on the frequency selected at step 1102, a question is asked at step 1103 as to whether the required synchronization data has been transmitted. If this question is answered in the negative, an incorrect frame has been received, resulting in control being directed to step 1104 such that the system waits for the next frame to be transmitted. If the question asked at step 1103 is answered in the affirmative, a question is asked at step 1105 as to whether the frame number is correct. Again, if this question is answered in the negative, control is returned to step 1104 and the system waits for the next frame to be transmitted.

If the question asked at step 1105 is answered in the affirmative, the mobile station has effectively achieved synchronization with its frequency hopping sequence allowing a call to be established at step 1106. The call progresses at step 1407 and a question is asked at step 1108 as to whether the call has been cleared. When answered in the negative, control is returned to step 1107 until the question is answered in the affirmative, resulting in clearing procedures being instigated at step 1109 whereafter the process terminates.

The procedures illustrated in FIG. 11 allow microcells in close proximity to co-exist without introducing intolerable level of interference. However, in order to operate in this way, it is necessary to make modification to the cellular telephone such that microcells are not available to users who have differently configured equipment. Thus, in some environment is may be desirable to adopt the procedures of the fourth preferred embodiment but again this will depend primarily upon underlying circumstances which may themselves change as new microcells are introduced into the geographical area.

In an alternative embodiment the pseudo random sequence is temporarily broken in order to facilitate synchronization between a mobile telephone and a private base station. In this way, it is possible to provide the mobile telephone with more than one burst period during which transmissions occur at the same frequency, ie without a frequency hop occurring. In this way, more time is provided for the mobile telephone to synchronize to the base station such that, say after two burst periods, it is possible for the frequency hopping to be resumed burst-by-burst.

For example, a frequency hopping sequence may be specified as F1-F2-F3-F4- . . . FN. Preferably, synchronization occurs during transmission of frequency F2 therefore the sequence may be broken to facilitate synchronization at this frequency. Thus, both the mobile telephone and the private base station would be configured so as to brake the pseudo random sequence by effectively transmitting data at the F2 frequency for more than one burst period. Thus, the previously specified pseudo random frequency hopping sequence may be replaced by the following, F1-F2-F2-F4 . . . FN.

What is a claimed is:

1. A base station configured to communicate with cellular mobile telephones, said cellular mobile telephones being operable within a time division multiple access macro cellular network utilizing a plurality of timeslots of defined duration within a time frame having a defined number of timeslots, said base station including signaling means for establishing a call and transmission a means for transmitting user traffic, wherein said base station is a private base station separate from and not forming part of a macro cellular network, and said base station is arranged to provide communication directly between one of said cellular mobile telephones and a public switched terrestrial network;

said signaling means is configured to establish a call by transmitting signaling information over an available timeslot of said defined duration within a time frame having said defined number of timeslots; and said transmission means is configured to transmit user-traffic via the same timeslot used for establishing the call by said signaling means.

2. A private base station according to claim 1, wherein said processing means is configured to synchronize said base station to a second base station and thereafter identify itself as being available to synchronize a third base station.

3. A base station according to claim 2, wherein a synchronized base station identifies transmission characteristics of a master base station and performs transmissions using alternative transmission characteristics.

4. A base station according to claim 1, wherein the timeslot being used for the transmission of user traffic is fully occupied by the transmission of said user traffic when configured to transmit user traffic.

5. A base station according to claim 1, wherein said user traffic is transmitted at half rate and intervening timeslots are available for signaling.

6. A method of communication between base stations and cellular mobile telephones, said cellular mobile telephones being operable within a time division multiple access macro cellular network utilizing a plurality of timeslots of defined duration within a time frame having a defined number of timeslots, wherein said base stations establish calls by signaling and thereafter effect said established call by transmission, wherein said base station is a private base station separate from and not forming part of a macro cellular network, and said base station is arranged to provide communication directly between one of said cellular mobile telephones and the public switched terrestrial network;

said signaling step is performed to establish a call by transmitting signaling information over an available timeslot of said defined duration within a time frame having said defined number of timeslots; and said transmission step is performed using the same timeslot used for establishing said call by the signaling step.

7. A method according to claim 6, wherein said base station is synchronized to a second base station and thereafter identifies itself as being available to synchronize a third base station.

8. A method of communicating according to claim 7, wherein a synchronized base station identifies transmission characteristics of a master base station and performs transmissions using alternative transmission characteristics.

9. A method of communicating according to claim 6, wherein the timeslot being used for the transmission of user traffic is fully occupied by the transmission of said user traffic when configured to transmit user traffic.

10. A method of communicating according to claim 6, wherein said user traffic is transmitted at half rate and intervening timeslots are available for signaling.

11. A base station configured to communicate with cellular mobile telephones operable within a DCS 1900 cellular network utilizing a plurality of timeslots of defined duration within a time frame having a defined number of timeslots, said base station including signaling means for establishing a call and transmission means for transmitting user traffic, wherein said base station is a private base station separate from and not forming part of a macro cellular network, and said base station is arranged to provide communication directly between one of said cellular mobile telephones and a public switched terrestrial network;

said signaling means is configured to establish a call by transmitting signaling information over an available timeslot of said defined duration within a time frame having said defined number of timeslots; and said transmission means is configured to transmit user-traffic via the same timeslot used for establishing the call by said signaling means.

12. A base station configured to communicate with cellular mobile telephones operable within a GSM cellular network utilizing a plurality of timeslots of defined duration within a time frame having a defined number of timeslots, said base station including signaling means for establishing a call and transmission means for transmitting user traffic, wherein said base station is a private base station separate from and not forming part of a macro cellular network, and said base station is arranged to provide communication directly between one of said cellular mobile telephones and a public switched terrestrial network;

said signaling means is configured to establish a call by transmitting signaling information over an available timeslot of said defined duration within a time frame having said defined number of timeslots; and said transmission means is configured to transmit user-traffic via the same timeslot used for establishing the call by said signaling means.

* * * * *